Patented Feb. 21, 1950

2,498,207

UNITED STATES PATENT OFFICE 2,498,207

PAPER COATING COMPOSITION AND COATED PAPER

Herman C. N. Heckel, Oxford, Ohio, assignor to The Champion Paper & Fibre Company, Hamilton, Ohio, a corporation of Ohio No Drawing. Application September 6, 1945, Serial No. 614,807

2 Claims. (Cl. 106—163)

The present invention relates to paper coating compositions suitable for use in the manufacture of coated paper for high grade printing and to the coated paper made therefrom.

Paper coating compositions for this purpose customarily consist of a mixture of mineral pigment such as china clay, calcium carbonate, satin white, and the like, suspended in an aqueous solution or dispersion of an adhesive. Casein, soybean protein, and starch, in one form or another, have been the almost universally used adhesives for this purpose, because coating compositions based upon them, among other things flow well and spread uniformly, and consequently paper coated therewith after calendering provides an excellent base for printing.

I have found that compositions comprising an aqueous dispersion of mineral pigment and an alkaline solution of oxidized cellulose may be prepared which have excellent paper coating properties. The compositions of my invention have good bonding properties between the pigment and the paper, and between the pigment particles of the coating—a necessary condition to prevent picking or lifting on the printing press. Also, these coating compositions are free-flowing, even when they contain a relatively high percentage of total solids, thus permitting an economy in the drying operation. Furthermore, they are characterized by a property necessary for all good paper coating compositions, which may be described as good spreading qualities. By this is meant the ability to be evenly and uniformly distributed upon a web of paper by means of the customary rolls, brushes, and other smoothing or distributing devices common in the art. Flowing and spreading properties of a coating composition can seldom be predicted from the nature of the adhesive used, but unless the coatings do possess these qualities they will be of little value in the manufacture of coated paper.

This property of smooth and uniform distribution contributes greatly to the finishing and printing qualities of the coated paper. Casein coated papers have long been the quality standard in coated papers. Coated paper made according to the present invention is equal in quality to casein coated paper and substantially better than most grades of starch coated paper in uniformity of ink absorption, fidelity of halftone reproductions, and other printing qualities. It is especially adapted for gloss ink printing and varnishing.

In addition to the foregoing characteristics, the compositions of the present invention have an advantage over casein-containing coatings in being odorless, and they have an advantage over protein- or starch-containing coatings in that they are substantially free from bacterial spoilage. Furthermore there is practically no discoloration due to the adhesive, thus permitting the full brightness or color value of the pigments employed.

The first step in the preparation of the oxidized cellulose adhesive in the present invention consists in treating the cellulose with a suitable oxidizing agent, such as nitrogen peroxide. Apparently a fairly wide range of conditions may be employed in carrying out this oxidation, with better or poorer results depending upon the particular conditions chosen. I prefer to carry out the oxidation with gaseous nitrogen peroxide at about room temperature, and continue the oxidation for several hours. However, if desired, the cellulose may be treated with liquid nitrogen peroxide. As is well known, oxidation of cellulose by nitrogen peroxide under the conditions described produces substantially no degradation of the cellulose.

For best results the oxidation of the cellulose should be continued until the carboxyl content of the oxidized cellulose as determined by the hereinafter described titration method, amounts to between 4 and 22 per cent of the weight of the oxidized cellulose, and advantageously between 7 and 16 per cent carboxyl content. Below about 4 per cent carboxyl content the product is incompletely soluble in dilute alkali. As the carboxyl content increases, the viscosity of coatings made therefrom at a given solids content decreases to about 12 per cent, and thereafter remains at a fairly constant low viscosity. At much higher carboxyl contents there is sometimes an increase in viscosity of the coatings. The adhesive strength of coatings made according to the present invention increases as the carboxyl content increases from about 4 per cent to 7 per cent, and then remains relatively constant through 15 per cent, after which the strength diminishes. Ordinarily from 8 to 30 parts oxidized cellulose are required to bond adequately 100 parts mineral pigment, depending upon the particular pigment used and the method of preparation of the oxidized cellulose.

The carboxyl contents as reported are determined by immersing 1 gram dry weight of the oxidized product in 100 cc. of N/2 sodium acetate solution previously adjusted to a pink coloration using phenolphthalein. After standing 15 minutes with occasional stirring, the acetate solution is again brought to the phenolphthalein end point with standard NaOH solution. The volume required is noted and ⅛ of said volume of the standard alkali is added in excess. After standing 1 hour with frequent stirring, the excess alkali is titrated with standard acid.

In preparing the coating composition the oxidized cellulose is first treated with alkali to put it into solution. For this purpose I prefer to use sodium hydroxide or sodium carbonate, but other alkalies including ammonia, may be employed for this purpose. One part of the oxidized cellulose is immersed in 5 parts of water, and concentrated alkali solution is added until solution is complete. The amount of alkali required will vary as the carboxyl content varies. The pH is finally adjusted to 10 to 11 to insure complete solution and if desired the solution may be ink milled or otherwise subjected to mechanical agitation to assist complete dispersion.

The incorporation of the alkaline solution of oxidized cellulose with a pigment is advantageously carried out by intimately mixing the adhesive with an aqueous slurry of the pigment, for example in a ball mill or other mixing apparatus. The cellulose employed may, so far as I know, be in the form of wood pulp produced by a sulfate, soda, or sulfite process, rag pulp, cotton linters, etc. In general I prefer to use pulps high in alpha cellulose content, as these give quite colorless products.

The following example is given to illustrate the invention. Seventy-five grams (90 per cent bone dry weight) of a chemically refined wood pulp high in alpha cellulose in the form of thin strips, was exposed to a gentle stream of gaseous nitrogen peroxide for 6 hours at room temperature. The nitrogen peroxide was then displaced with air and the product thoroughly washed in water. It had a carboxyl content of 11 per cent as determined by the above-described titration method. The product was then mechanically disintegrated in water. A 20 per cent solution of sodium hydroxide was added to dissolve the oxidized cellulose, to give a solution containing 289.5 grams of water and 10.5 grams sodium hydroxide. The product was a fairly viscous material of a faint yellow color.

Three hundred and seventy-five grams of the alkaline solution of oxidized cellulose was mixed with 500 grams of coating clay, and 1 gram of tetrasodium pyrophosphate to disperse the clay. Enough water was added to produce a composition of 50 per cent total solids. The mixture was ball milled for two hours. The resulting coating composition had a pH of about 7 and was comparatively fluent and easily spreadable upon paper. It had a Krebs viscosity of 120 grams (A. S. T. M. method). This coating mixture was then applied to a conventional paper stock, the weight of dry coating being about 4 pounds per 1000 square feet. After drying, it was supercalendered in the normal manner and printed. The paper had a good uniform gloss and color, and the printing and varnishing qualities were excellent.

Coated paper prepared as above described may be rendered effectively waterproof so that it can be used for lithography, by the application of a dilute solution of a heavy metal salt, for example a 5–10 per cent aqueous solution of aluminum sulfate, zinc chloride, etc.

I claim:
1. Paper coating composition adaptable for the manufacture of coated printing paper which comprises a fluent, easily spreadable aqueous dispersion of 100 parts of mineral pigment, and from 8 to 30 parts of an adhesive comprising oxidized cellulose, said oxidized cellulose being prepared by treating cellulose with nitrogen peroxide until the product contains from 7 to 16 per cent carboxyl content determined by titration, and then dissolved in alkali, said coating composition having a solids content of about 50%.

2. Coated paper having substantially the same printing qualities as casein coated paper which comprises paper base carrying a coating adherent thereto and deposited from an aqueous composition comprising mineral pigment 100 parts dry weight, and from 8 to 30 parts of an adhesive comprising oxidized cellulose dissolved in alkali, said oxidized cellulose being prepared by treating cellulose with nitrogen peroxide to give a carboxyl content of from 7 to 16 per cent, said aqueous composition having a solids content of about 50%.

HERMAN C. N. HECKEL.

REFERENCES CITED

The following references are of record in the file of this patent:

UNITED STATES PATENTS

| Number | Name | Date |
|---|---|---|
| Re. 3,842 | Schenck | Feb. 15, 1870 |
| 147,833 | Fell | Feb. 24, 1874 |
| 326,088 | Alexander | Sept. 15, 1885 |
| 2,232,990 | Yacket et al. | Feb. 25, 1941 |
| 2,256,391 | Hiatt | Sept. 16, 1941 |
| 2,335,126 | Lilienfeld | Nov. 23, 1943 |
| 2,422,572 | Lilienfeld | June 17, 1947 |

FOREIGN PATENTS

| Number | Country | Date |
|---|---|---|
| 187,987 | Great Britain | Jan. 28, 1924 |